United States Patent [19]
Baker

[11] 3,989,397
[45] Nov. 2, 1976

[54] CORNER CONNECTOR FOR WATERBED PEDESTALS

[76] Inventor: Richard M. Baker, 1368 Berkley St., Anaheim, Calif. 92804

[22] Filed: Oct. 16, 1975

[21] Appl. No.: 623,096

[52] U.S. Cl. .............................. 403/205; 403/231; 52/288
[51] Int. Cl.² .......................................... A47B 57/00
[58] Field of Search .................... 403/231, 205, 403; 52/282, 288, 287, 753 D, 753 Y

[56] References Cited
UNITED STATES PATENTS

| | | | |
|---|---|---|---|
| 123,708 | 2/1872 | Kinne | 52/282 |
| 1,398,852 | 11/1921 | Gilbert | 52/753 D |
| 2,168,911 | 8/1939 | Meyer | 52/753 D |
| 2,379,179 | 6/1945 | Petersen | 52/285 |
| 3,381,430 | 5/1968 | Wiczer | 52/282 |

FOREIGN PATENTS OR APPLICATIONS

| | | | |
|---|---|---|---|
| 1,345,991 | 11/1963 | France | 52/288 |
| 1,175,346 | 11/1958 | France | 52/288 |
| 1,311,988 | 11/1962 | France | 52/282 |

*Primary Examiner*—Andrew V. Kundrat
*Attorney, Agent, or Firm*—Philip M. Hinderstein

[57] ABSTRACT

An improvement in a corner connector for a waterbed pedestal for rigidly joining the ends of the pedestal board members, the connector being of the type including first and second generally L-shaped plates, each having first and second sides interconnected to define first and second open-ended channels for receipt of the ends of the board members, the improvement being that the adjacent sides of the plates are non-parallel, the spacing between the adjacent sides at the bases of the channels being approximately equal to the thickness of the board members and the spacing between the adjacent sides at the entrances of the channels being slightly less than the thickness of the board members and that the channels have enlarged openings at the entrances thereof which are slightly greater than the thickness of the board members whereby the ends of the board members may be forced into the channels and the sides of the plates frictionally engage and retain the sides of the board members.

1 Claim, 6 Drawing Figures

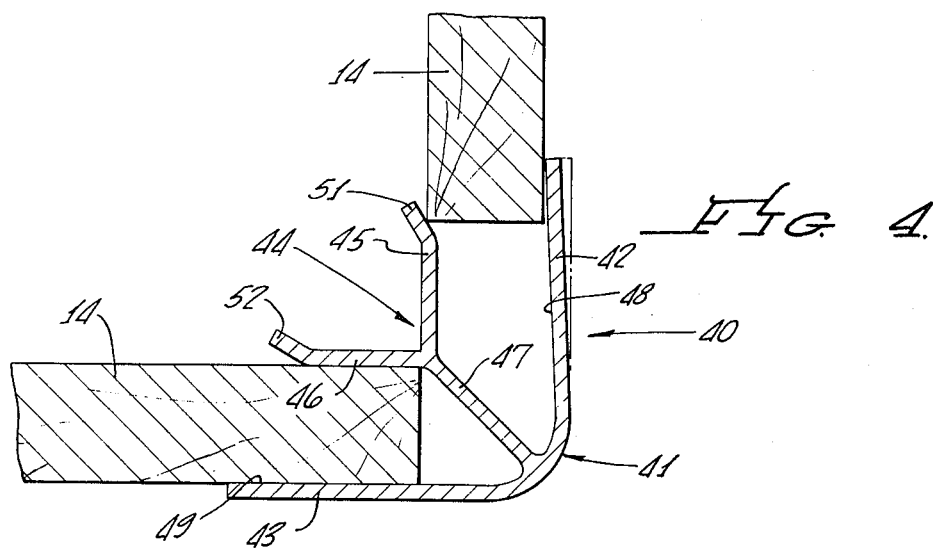
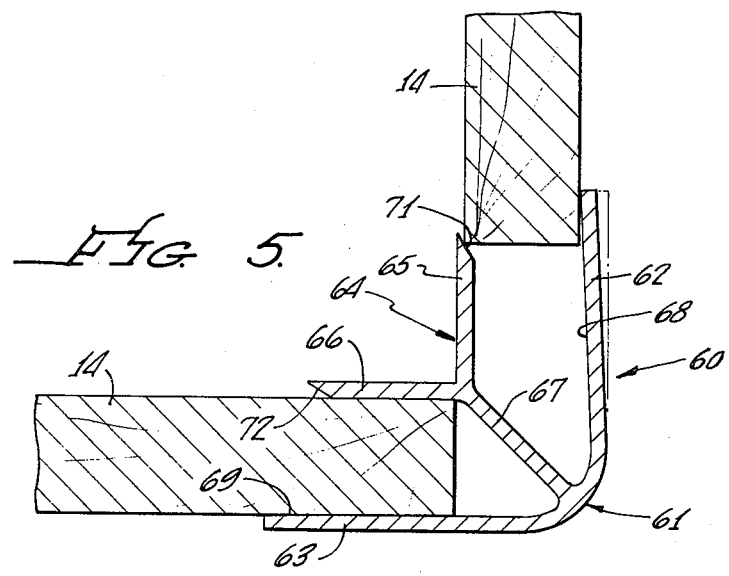
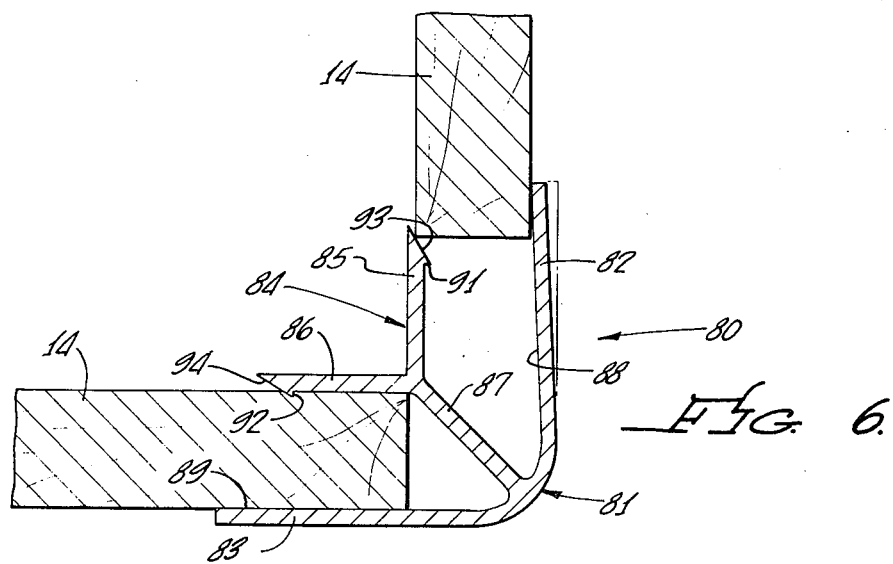

3,989,397

CORNER CONNECTOR FOR WATERBED PEDESTALS

BACKGROUND OF THE INVENTION

1. Field of the Invention

The present invention relates to an improvement in a corner connector for waterbed pedestals and, more particularly, to a novel, right-angle connector for rigidly joining the ends of two board members in an inexpensive and efficient manner.

2. Description of the Prior Art

A conventional waterbed consists of a pedestal having a height which is approximately equal to the height of a conventional bed frame, the pedestal supporting a large board upon which the water mattress is positioned. The board may also support a frame for the water mattress.

The most common type of pedestal consists of four board members which are positioned vertically, in a rectangular configuration, and four right-angle connectors for rigidly joining the adjacent ends of the board members. The most common type of connector includes first and second generally L-shaped plates, each having first and second sides, and a member connected between the intersections between the first and second sides of the first and second plates for connecting the second plate within the angle defined by the first plate, with the first and second sides of the first plate in parallel, spaced-apart relationship to the first and second sides, respectively, of the second plate to define respective first and second open-ended channels for receipt of the ends of the board members. The sides of each channel are parallel and spaced by an amount which is approximately equal to or slightly greater than the thickness of the board members. The ends of the first and second sides of the second plate are bent inwardly to form tongues which extend into lateral grooves in the inside surface of each board member, at the opposite ends thereof. This tongue-and-groove construction prevents inadvertent and undesired removal of the board members from the connectors which could cause collapse of the pedestal.

While such a corner connector is very common, it requires each board member to be subjected to a machining operation to cut the grooves in the inside surface thereof, at both ends thereof. Such a machining operation is time-consuming and represents an additional labor and machinery cost.

SUMMARY OF THE INVENTION

According to the present invention, there is provided an improved right-angle connector which solves these problems in a manner unknown heretofore. With the present right-angle connector, it is unnecessary to perform any machining operation on the board members other than the normal manufacturing operations. With the present improved connector, the ends of the board members are rigidly interconnected without the necessity for any modification thereto.

Briefly, the present improvement consists of a connector wherein the sides of the two channels are non-parallel, the spacing between the adjacent sides at the bases of each channel being approximately equal to the thickness of the board members and the spacing between the adjacent sides at the entrances of each channel being slightly less than the thickness of the board members, and wherein the ends of the first and second sides of either the first or second plates, adjacent the entrances to the channels, are tapered to provide enlarged openings at the entrances which are slightly greater than the thickness of the board members, whereby the ends of the board members may be forced into the channels and the sides of the plates frictionally engage and retain the sides of the board members.

According to the preferred embodiments of the invention, the first and second sides of the inner plate are perpendicular and the first and second sides of the outer plate are positioned at an acute angle of slightly less than 90° to form the reduced openings at the entrances to the channels.

OBJECTS

It is therefore an object of the present invention to provide an improved corner connector for waterbed pedestals.

It is a further object of the present invention to provide an improved right-angle connector for rigidly joining the ends of two board members.

It is a still further object of the present invention to provide a corner connector for waterbed pedestals which minimizes manufacturing costs in the manufacture of waterbed pedestals.

It is another object of the present invention to provide a corner connector for waterbed pedestals which eliminates the necessity for cutting grooves in the board members which form the pedestals.

Still other objects, features, and attendant advantages of the present invention will become apparent to those skilled in the art from a reading of the following detailed description of the preferred embodiments constructed in accordance therewith, taken in conjunction with the accompanying drawings wherein like numerals designate like parts in the several figures and wherein:

BRIEF DESCRIPTION OF THE DRAWINGS

FIGS. 4–6 are sectional views, similar to FIG. 2, showing the preferred embodiments of the present improved corner connector for waterbed pedestals of the type shown in FIG. 1.

DESCRIPTION OF THE PREFERRED EMBODIMENTS

Figure 1:
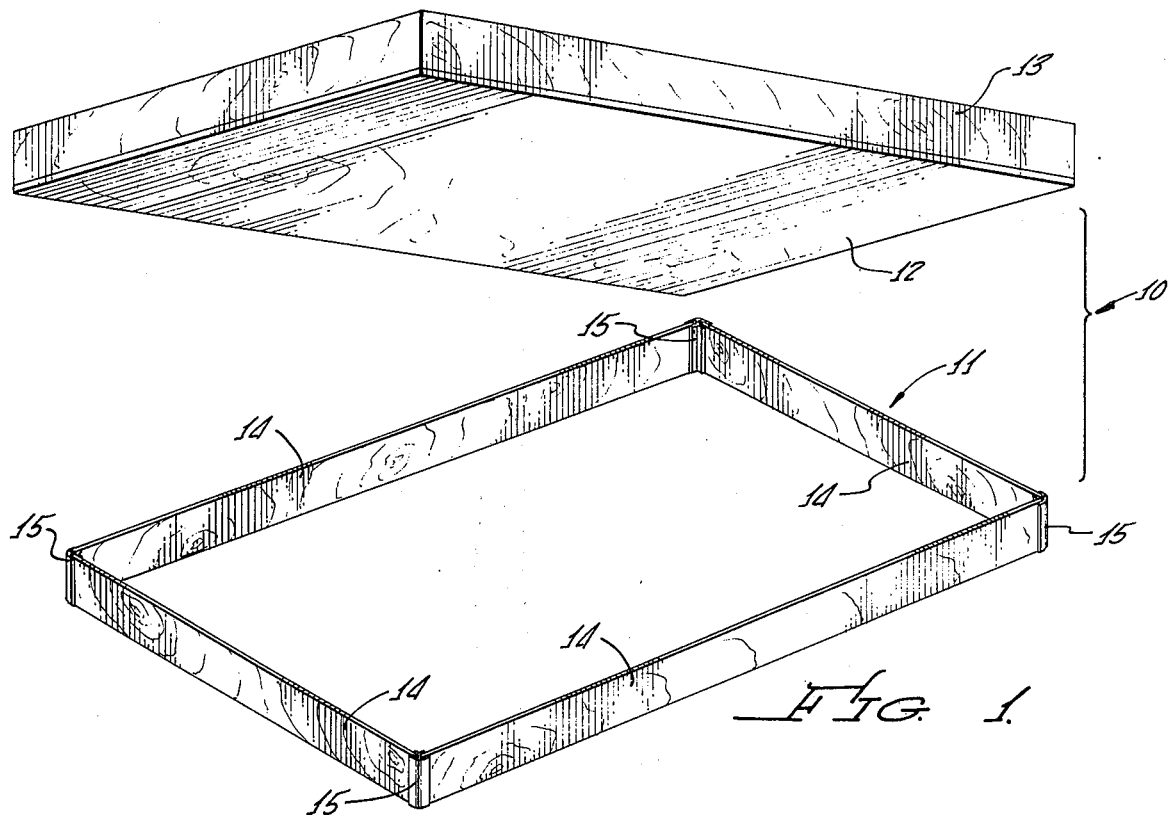
FIG. 1 is an exploded, perspective view of a conventional waterbed.

Referring now to the drawings and, more particularly, to FIG. 1 thereof, there is shown a conventional waterbed, generally designated 10, consisting of a pedestal 11 which supports a board 12 in parallel, spaced relationship relative to a floor. Positioned above board 12 is the water mattress and/or frame 13.

Pedestal 11 consists of four elongate board members 14 which are positioned vertically, at right angles to each other, the adjacent ends of board members 14 being interconnected by identical right-angle connectors 15.

Figure 2:
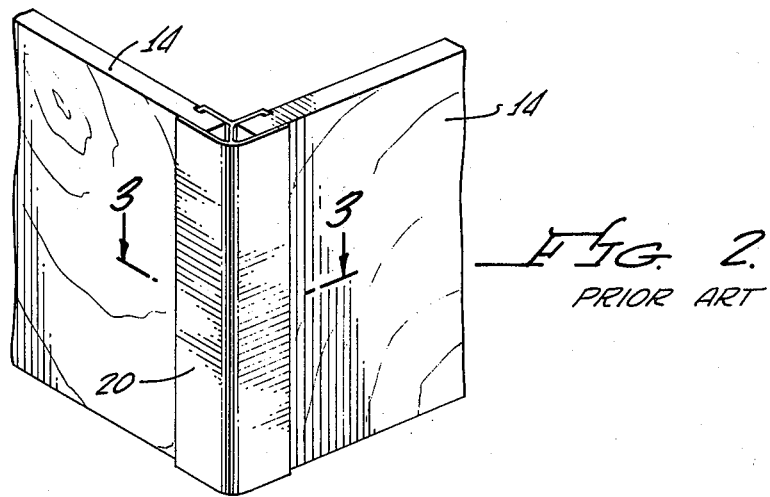
FIG. 2 is an enlarged perspective view of a prior art corner connector for the pedestal of the waterbed of FIG. 1.
Figure 3:
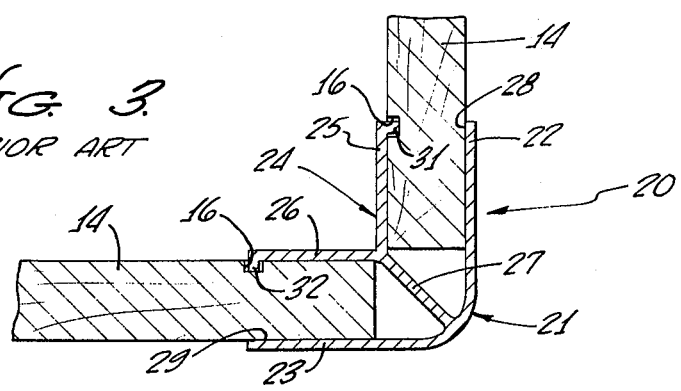
FIG. 3 is an enlarged sectional view taken along the line 3—3 in FIG. 2.

Referring now to FIGS. 2 and 3, there is shown a common type of prior art corner connector, designated 20. Corner connector 20 is of a type including first and second generally L-shaped plates 21 and 24, plate 21 having perpendicular sides 22 and 23 and plate 24 having perpendicular sides 25 and 26. A third plate 27 is connected between the intersections between sides 25 and 26 of plate 24 and sides 22 and 23 of plate 21 for connecting plates 21 and 24 with sides 22 and 25 parallel and sides 22 and 26 parallel. Thus, plates 21 and 24 define first and second open-ended channels 28 and 29 for receipt of the ends of board members 14.

The spacing between sides 22 and 25 and sides 23 and 26 of plates 21 and 24, respectively, is approximately equal to the thickness of board members 14. Therefore, in order to prevent board members 14 from being inadvertently removed from channels 28 and 29 which would cause the collapse of pedestal 11, lateral grooves 16 are cut in the inner surfaces of board members 14 along lines which will, in use, be aligned with the ends of sides 25 and 26 of plate 24. Furthermore, the ends of sides 25 and 26 are bent inwardly, at right angles, to form tongues 31 and 32 which extend into respective grooves 16. This tongue-and-groove construction rigidly joins the ends of board members 14.

According to the present invention, the necessity for cutting grooves 16 in board members 14 is eliminated. More specifically, and with references to FIG. 4, there is shown a first embodiment of right-angle connector, generally designated 40, constructed in accordance with the teachings of the present invention. Right-angle connector 40 is similar to connector 20 in that it includes first and second plates 41 and 44 having sides 42 and 43 and sides 45 and 46, respectively, and a plate 47 interconnecting plates 41 and 44 so as to define open-ended channels 48 and 49. However, in the case of connector 40, sides 42 and 45 are nonparallel and sides 43 and 46 are non-parallel, the spacing between sides 42 and 45 and sides 43 and 46 at the bases of channels 48 and 49 being approximately equal to the thickness of board members 14 and the spacing between sides 42 and 45 and sides 43 and 46 at the entrances of channels 48 and 49 being slightly less than the thickness of board members 14. This is achieved, preferably, by making sides 45 and 46 of plate 44 perpendicular and by positioning sides 42 and 43 of plate 41 at an acute angle of slightly less than 90°.

Furthermore, ends 51 and 52 of sides 45 and 46, respectively, of plate 44 are bent away from sides 42 and 43, respectively, of plate 41 to form tapers which provide enlarged openings at the entrances to channels 48 and 49, respectively, which are slightly greater than the thickness of board members 14.

With such a construction, the ends of board members 14 freely enter the entrances to channels 48 and 49, as shown adjacent channel 48 in FIG. 4. By applying an increased pressure to board members 14, sides 42 and 43 of plate 41 flex outwardly, permitting entry of board members 14 into channels 48 and 49 to the position shown in channel 49 in FIG. 4. In this position, the sides of each channel 48 and 49 frictionally engage and retain the sides of board members 14, forming a rigid connection and preventing the inadvertent removal of board members 14 from channels 48 and 49.

Referring now to FIG. 5, there is shown a second embodiment of right-angle connector, generally designated 60, constructed in accordance with the teachings of the present invention. Right-angle connector 60 is similar to connector 40 in that it includes first and second plates 61 and 64 having sides 62 and 63 and sides 65 and 66, respectively, and a plate 67 interconnecting plates 61 and 64 so as to define open-ended channels 68 and 69. As was the case with connector 40, sides 62 and 65 are non-parallel and sides 63 and 66 are non-parallel, the spacing between sides 62 and 65 and sides 63 and 66 at the bases of channels 68 and 69 being approximately equal to the thickness of board members 14 and the spacing between sides 62 and 65 and sides 63 and 66 at the entrances of channels 68 and 69 being slightly less than the thickness of board members 14. As was the case with connector 40, this is preferably achieved by making sides 65 and 66 of plate 64 perpendicular and by positioning sides 62 and 63 of plate 61 at an acute angle of slightly less than 90°. On the other hand, in both connectors 40 and 60, the sides of plates 41 and 61, respectively, may be perpendicular and the sides of plates 44 and 64, respectively, may be positioned at an obtuse angle of slightly greater than 90°.

In any event, the ends of sides 65 and 66 of plate 64 have a reduced thickness to form tapered surfaces 71 and 72 which provide enlarged openings at the entrances to channels 68 and 69, respectively, which are slightly greater than the thickness of board members 14.

With such a construction, the ends of board members 14 freely enter the entrances to channels 68 and 69, as shown adjacent channel 68 in FIG. 5. By applying an increased pressure to board members 14, sides 62 and 63 of plate 61 flex outwardly, permitting entry of board members 14 into channels 68 and 69 to the position shown in channel 69 in FIG. 5. In this position, the sides of each channel 68 and 69 frictionally engage and retain the sides of board members 14, forming a rigid connection and preventing the inadvertent removal of board members 14 from channels 68 and 69.

Referring now to FIG. 6, there is shown a third embodiment of right-angle connector, generally designated 80, constructed in accordance with the teachings of the present invention. Right-angle connector 80 is similar to connectors 40 and 60 in that it includes first and second plates 81 and 84 having sides 82 and 83 and sides 85 and 86, respectively, and a plate 87 interconnecting plates 81 and 84 so as to define open-ended channels 88 and 89. As was the case with connectors 40 and 60, sides 82 and 85 are non-parallel and sides 83 and 86 are non-parallel, the spacing between sides 82 and 85 and sides 83 and 86 at the bases of channels 88 and 89 being approximately equal to the thickness of board members 14 and the spacing between sides 82 and 85 and sides 83 and 86 at the entrances of channels 88 and 89 being slightly less than the thickness of board members 14. This may be achieved in either of the manners discussed previously with respect to connector 60.

The ends of sides 85 and 86 of plate 84 have at least one triangularly-shaped tooth 91 and 92, respectively, made integral therewith to form tapered surfaces 93 and 94, respectively, at the entrances to channels 88 and 89, respectively. Surfaces 93 and 94 of teeth 91 and 92, respectively, provide enlarged openings at the entrances to channels 88 and 89, respectively, which are slightly greater than the thickness of board members 14.

With such a construction, the ends of board members 14 freely enter the entrances to channels 88 and 89, as shown adjacent channel 88 in FIG. 6. By applying an increased pressure to board members 14, sides 82 and 83 of plate 81 flex outwardly, permitting entry of board members 14 into channels 88 and 89 to the position shown in channel 89 in FIG. 4. In this position, the sides of each channel 88 and 89, as well as teeth 91 and 92, frictionally engage and retain the sides of board members 14, forming a rigid connection and preventing the inadvertent removal of board members 14 from channels 88 and 89.

It can therefore be seen that according to the present invention, there is provided improved right-angle connectors which solve the problems encountered heretofore in an inexpensive and efficient manner. With the present right-angle connectors, it is unnecessary to perform any machining operation on board members 14, other than the normal manufacturing operations. With connectors 40, 60, and 80, the ends of board members 14 are rigidly interconnected without the necessity for any modification thereto.

While the invention has been described with respect to the preferred physical embodiments constructed in accordance therewith, it will be apparent to those skilled in the art that various modifications and improvements may be made without departing from the scope and spirit of the invention. Accordingly, it is to be understood that the invention is not to be limited by the specific illustrative embodiments, but only by the scope of the appended claims.

I claim:

1. In a right-angle connector for rigidly joining the ends of two board members of the type including first and second generally L-shaped plates, each having first and second sides, and means connected between the intersections between said first and second sides of said first and second plates for connecting said second plate within the angle defined by said first plate with said first and second sides of said first plate in generally parallel, spaced-apart relationship to said first and second sides, respectively, of said second plate to define respective first and second open-ended channels for receipt of said ends of said board members, the improvement wherein:

said first sides of said plates are non-parallel and said second sides of said plates are non-parallel, the spacing between adjacent sides at the bases of said channels being approximately equal to the thickness of said board members and the spacing between adjacent sides at the entrances of said channels being slightly less than the thickness of said board members;

said first and second sides of said second plate are perpendicular;

said first and second sides of said first plate are positioned at an acute angle of slightly less than 90°; and the ends of said first and second sides of said second plate are bent away from said first and second sides, respectively, of said first plate, adjacent said entrances to said channels, to provide enlarged openings at said entrances which are slightly greater than the thickness of said board members whereby said ends of said board members may be forced into said channels and said sides of said plates frictionally engage and retain the sides of said board members.

* * * * *